US011374280B2

(12) United States Patent
Kitazawa et al.

(10) Patent No.: US 11,374,280 B2
(45) Date of Patent: Jun. 28, 2022

(54) ELECTRICITY STORAGE DEVICE AND RAILROAD CAR

(71) Applicants: Kabushiki Kaisha Toshiba, Minato-ku (JP); Toshiba Infrastructure Systems & Solutions Corporation, Kawasaki (JP)

(72) Inventors: Yasuyuki Kitazawa, Fuchu (JP); Mitsuyo Yamashita, Koganei (JP); Naoyuki Kurisu, Kodaira (JP); Hiroaki Yoshinari, Kodaira (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 126 days.

(21) Appl. No.: 16/880,263

(22) Filed: May 21, 2020

(65) Prior Publication Data

US 2020/0280034 A1 Sep. 3, 2020

Related U.S. Application Data

(63) Continuation of application No. PCT/JP2018/041472, filed on Nov. 8, 2018.

(30) Foreign Application Priority Data

Nov. 24, 2017 (JP) .............................. JP2017-226158

(51) Int. Cl.
*H01M 50/20* (2021.01)
*H01M 10/613* (2014.01)
(Continued)

(52) U.S. Cl.
CPC ............... *H01M 50/20* (2021.01); *B61C 3/02* (2013.01); *H01M 10/613* (2015.04);
(Continued)

(58) Field of Classification Search
CPC ......... H01M 50/20; H01M 10/60–667; H01M 2220/20; B60L 5/00–42; B61C 3/02
See application file for complete search history.

(56) References Cited

U.S. PATENT DOCUMENTS

2004/0157117 A1  8/2004  Tamaki et al.
2012/0171532 A1  7/2012  Lee et al.
(Continued)

FOREIGN PATENT DOCUMENTS

EP   2 159 862 A1   3/2010
EP   2 187 473 A1   5/2010
(Continued)

OTHER PUBLICATIONS

International Search Report dated Dec. 25, 2018 in PCT/JP2018/041472 filed on Nov. 8, 2018 (with English Translation), 4 pages.

*Primary Examiner* — James Lee
(74) *Attorney, Agent, or Firm* — Oblon, McClelland, Maier & Neustadt, L.L.P.

(57) ABSTRACT

According to one embodiment, an electricity storage device includes a first box, a second box, a storage battery, and a flow path. The second box includes a side plate and is housed in the first box. The storage battery is disposed in the second box while being connected to the side plate. The flow path is configured to include the side plate of the second box inside the first box and outside the second box and vertically penetrates the first box.

7 Claims, 10 Drawing Sheets

(51) Int. Cl.
  *H01M 10/625* (2014.01)
  *H01M 10/6556* (2014.01)
  *H01M 10/6562* (2014.01)
  *B61C 3/02* (2006.01)
  *H01M 10/6551* (2014.01)
  *B60L 5/00* (2006.01)

(52) U.S. Cl.
  CPC ..... *H01M 10/625* (2015.04); *H01M 10/6556* (2015.04); *H01M 10/6562* (2015.04); *B60L 5/00* (2013.01); *H01M 10/6551* (2015.04); *H01M 2220/20* (2013.01)

(56) References Cited

U.S. PATENT DOCUMENTS

| | | |
|---|---|---|
| 2015/0270590 A1 | 9/2015 | Okutani et al. |
| 2017/0263985 A1 | 9/2017 | Nishikawa et al. |

FOREIGN PATENT DOCUMENTS

| | | |
|---|---|---|
| JP | 2004-231024 A | 8/2004 |
| JP | 2006-059730 A | 3/2006 |
| JP | 2010-055973 A | 3/2010 |
| JP | 2010-123349 A | 6/2010 |
| JP | 2014-089839 A | 5/2014 |
| JP | 2014-117001 A | 6/2014 |
| JP | 2014-135173 A | 7/2014 |
| JP | 2016-062705 A | 4/2016 |
| WO | WO 2014/068947 A1 | 5/2014 |

ELECTRICITY STORAGE DEVICE AND RAILROAD CAR

CROSS-REFERENCE TO RELATED APPLICATION

This is a Continuation Application of International Application No. PCT/JP2018/041472, filed on Nov. 8, 2018, which claims priority to Japanese Patent Application No. 2017-226158, filed on Nov. 24, 2017, and the entire contents of all of the aforementioned applications are incorporated herein by reference.

FIELD

Embodiments described herein relate generally to an electricity storage device and a railroad car.

BACKGROUND

Generally, a railroad car receives supply of power from an overhead line or a power generation system mounted on the railroad car. A railroad car includes an electricity storage device as an emergency power supply for securing certain functions for a certain period of time when supply of power is cut off. In recent years, since energy densities of storage batteries have increased, electricity storage devices mounted on a railroad car have been used as an emergency power supply combined with a system for supplying power to a drive system.

Battery modules are housed in an electricity storage device. A plurality of storage batteries in which electrodes and electrolytic solutions are housed are disposed inside the battery module. Conductors for connecting the storage batteries to each other and a control device of the storage batteries are also housed inside the battery module.

Storage batteries generate heat. Therefore, cooling of storage batteries with a fan to release heat generated from the storage batteries to the outside of the electricity storage device has been studied.

Generally, in a cooling system having a fan, a failure detection function for detecting a failure of the fan needs to be provided and the fan needs to be replaced on a regular basis according to the service life. Also, since external air is forcibly taken into the electricity storage device using a fan, a filter for removing dust and foreign matter needs to be provided upstream of the fan. Therefore, the filter needs to be replaced on a regular basis.

DETAILED DESCRIPTION

According to one embodiment, an electricity storage device includes a first box, a second box, a storage battery, and a flow path. The second box includes a side plate and is housed in the first box. The storage battery is disposed in the second box while being connected to the side plate. The flow path is configured to include the side plate of the second box inside the first box and outside the second box and vertically penetrates the first box.

Hereinafter, an electricity storage device and a railroad car according to an embodiment will be described with reference to the drawings.

First Embodiment

Hereinafter, a first embodiment of an electricity storage device of a railroad car will be described with reference to FIGS. 1 to 7.

Figure 1:
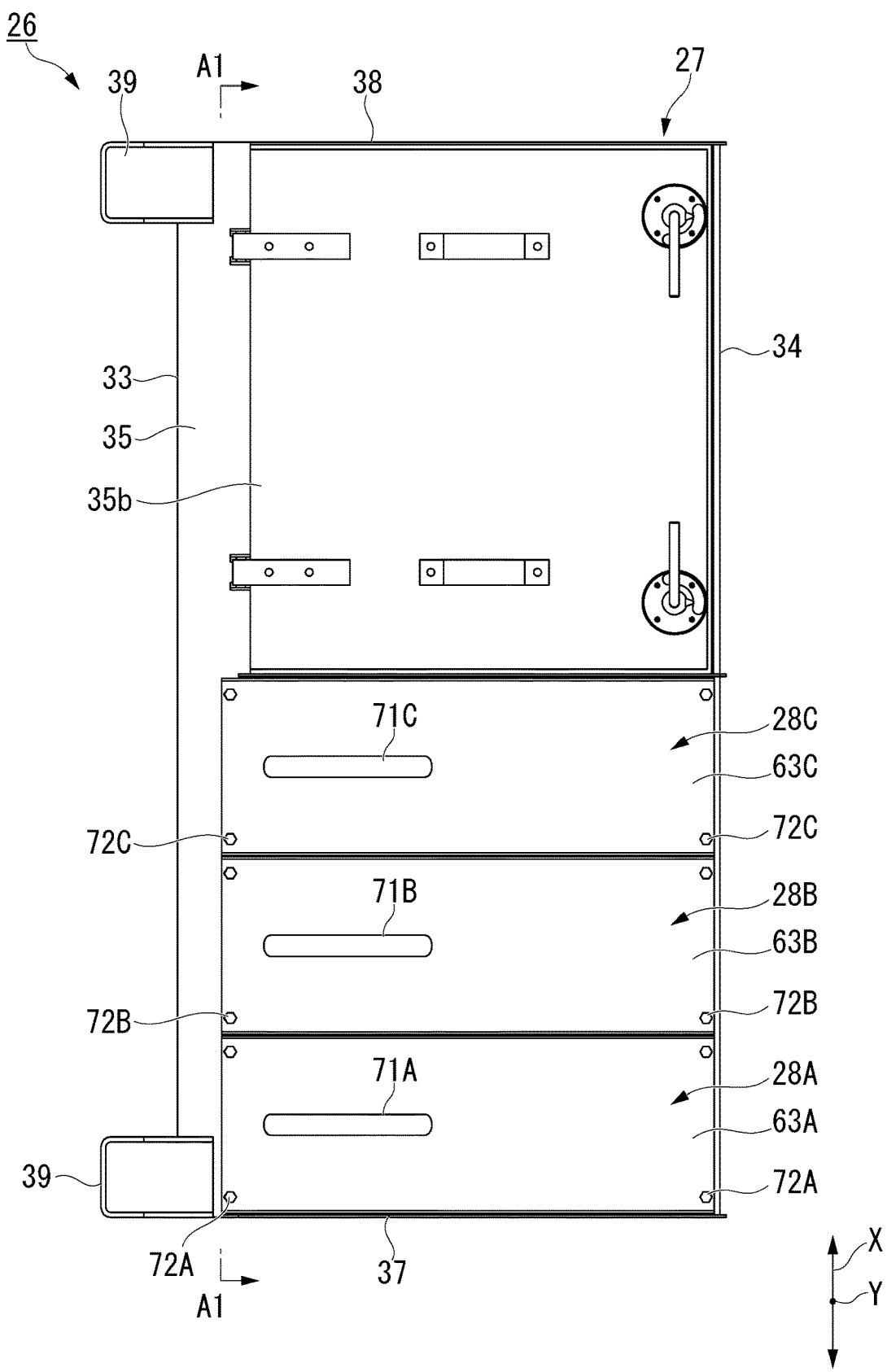
FIG. 1 is a front view showing an electricity storage device of a railroad car of a first embodiment.
Figure 2:
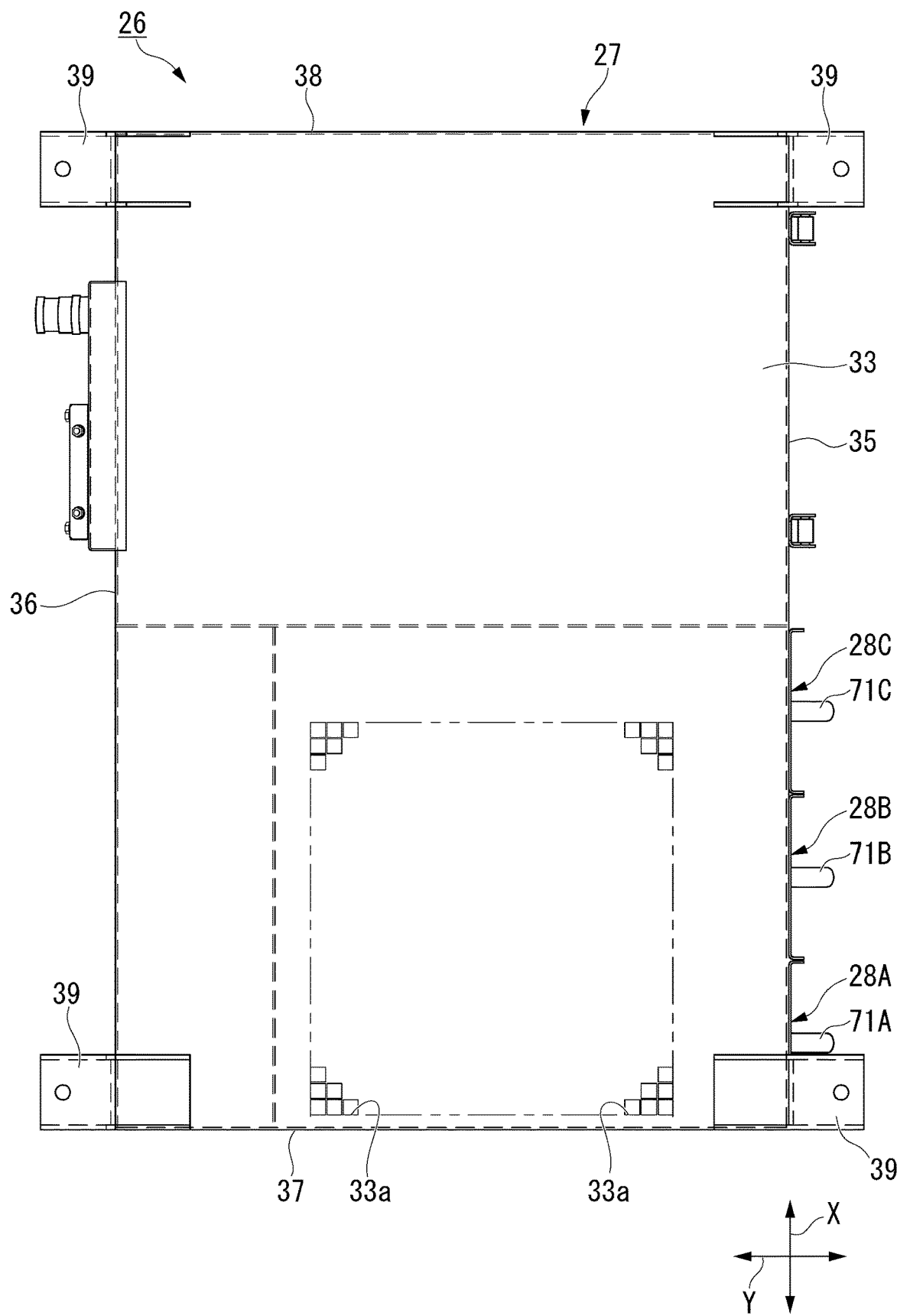
FIG. 2 is a plan view showing the electricity storage device of the railroad car of the first embodiment.
Figure 3:
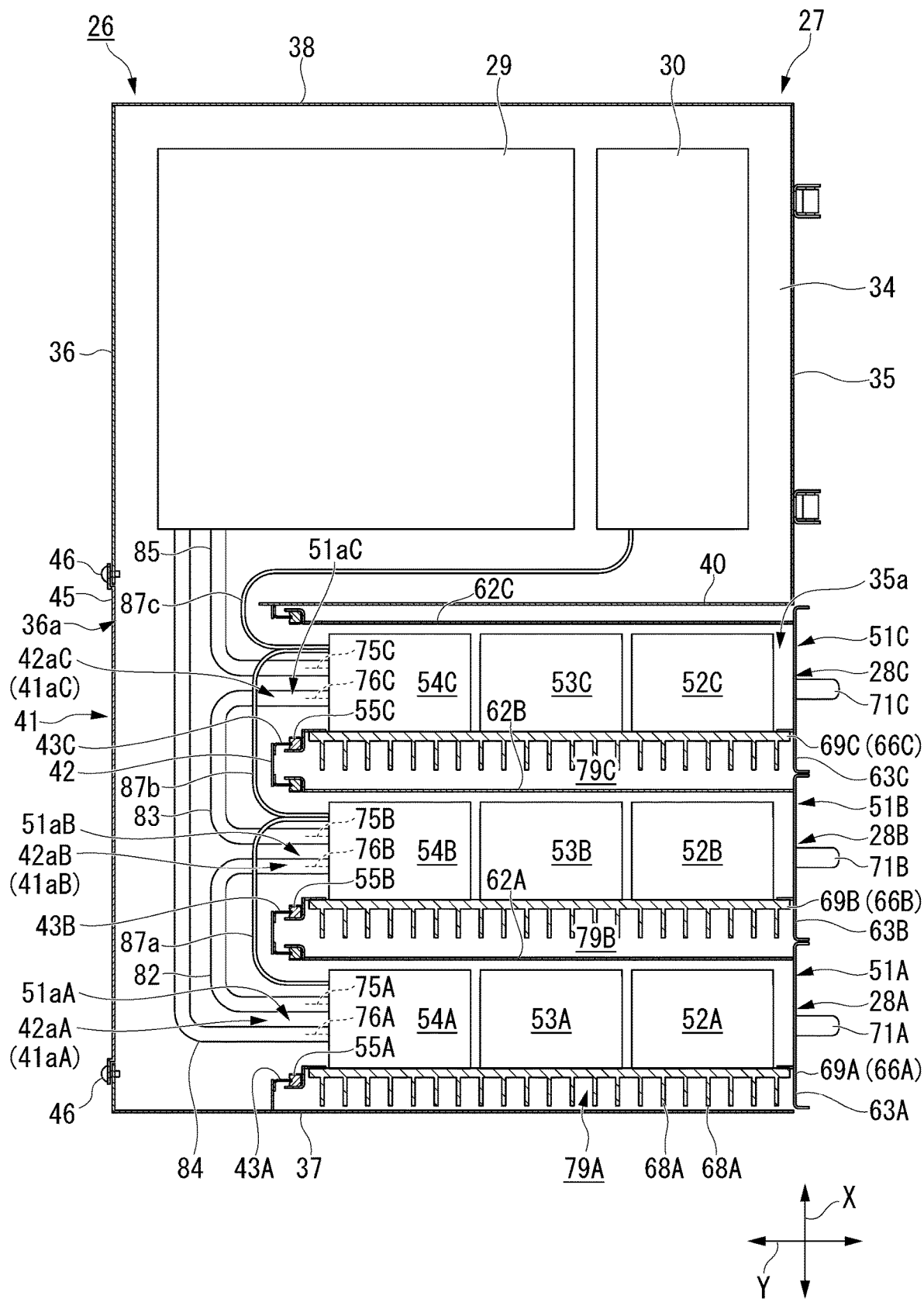
FIG. 3 is a cross-sectional view taken along section line A1-A1 in FIG. 1.

As shown in FIGS. 1 to 3, an electricity storage device 26 of the present embodiment includes a first box 27, a plurality (three in the present embodiment) of battery modules 28, a protection circuit 29, and a control circuit 30. Further, the number of battery modules 28 included in the electricity storage device 26 is not limited, and may be one, two, or four or more. The electricity storage device 26 is mounted, for example, under a floor of a car body of the railroad car.

Hereinafter, when the plurality of battery modules 28 are distinguished for indicating them individually, they are referred to as a battery module 28A, a battery module 28B, and a battery module 28C in order from the front toward the rear of the car body. When referring to the battery modules 28A, 28B, and 28C without distinguishing them from each other, they are collectively referred to as the battery module 28. However, reference numerals for the battery modules in the drawings are not denoted as 28 but denoted as 28A or the like. The same applies to an opening 42a, a receiving member 43, or the like to be described below.

An external form of the first box 27 is formed in a rectangular parallelepiped box shape. The first box 27 includes a first top plate 33, a first bottom plate 34, and first side plates 35 to 38. The first top plate 33, the first bottom plate 34, and the first side plates 35 to 38 are formed of a steel plate or the like.

For example, the first top plate 33 and the first bottom plate 34 are formed in a rectangular shape that is long in a longitudinal direction X (hereinafter, simply referred to as a longitudinal direction X) of the car body in plan view. The first top plate 33 and the first bottom plate 34 are disposed to face each other in a vertical direction. The first side plates 35 and 36 are provided to stand upright on outer edge portions in the longitudinal direction X of the first bottom plate 34. The first side plates 37 and 38 are provided to stand upright on outer edge portions of the first bottom plate 34 in a width direction Y (hereinafter, simply referred to as a width direction Y) of the car body.

Further, the first side plate 36 side with respect to the first side plate 35 is referred to as a right side, and the first side plate 35 side with respect to the first side plate 36 is referred to as a left side. The first side plate 37 side with respect to the first side plate 38 is referred to as the front, and the first side plate 38 side with respect to the first side plate 37 is referred to as the rear.

As shown in FIG. 2, a plurality of first through-holes 33a are formed in the front portion of the first top plate 33. The plurality of first through-holes 33a are disposed in a grid pattern. As shown in FIGS. 1 and 2, a mounting member 39 for fixing the first box 27 to the car body is fixed to each corner of the first top plate 33. The mounting member 39 protrudes upward with respect to the first top plate 33 of the first box 27.

Although not shown, a plurality of first through-holes are formed in the first bottom plate 34 at a position facing the plurality of first through-holes 33a of the first top plate 33.

As shown in FIG. 3, an opening 35a is formed in the front portion of the first side plate 35. A first partition plate 40 extending to the right side is attached to an edge portion of the first side plate 35 behind the opening 35a. The first partition plate 40 extends to an intermediate portion between the first side plate 35 and the first side plate 36.

Further, as shown in FIG. 1, an inspection cover 35b is provided in the rear portion of the first side plate 35. The inspection cover 35b is used for inspection work of the protection circuit 29 and the control circuit 30.

As shown in FIG. 3, a first partition plate (partition plate) 41 extending to the front is attached to a right end portion of the first partition plate 40. The first partition plates 40 and 41 are provided in the first box 27. The first partition plate 41 includes a plate main body 42 and a plurality of receiving members 43.

The plate main body 42 extends to the front from the right end portion of the first partition plate 40 until reaching the first side plate 37. The plate main body 42 is joined to the first side plate 37 by welding or the like.

The first partition plate 40 and the plate main body 42 extend to the first top plate 33 and the first bottom plate 34 and are joined to the first top plate 33 and the first bottom plate 34 by welding or the like.

A plurality (three in the present embodiment) of openings 42aA, 42aB, and 42aC are formed in the plate main body 42. Each of the openings 42a is formed in a rectangular frame shape when viewed in the width direction Y. The plurality of openings 42aA, 42aB, and 42aC are disposed to be aligned in that order from the front to the rear in the longitudinal direction X with spaces therebetween.

A receiving member 43A (one of the plurality of receiving members 43) described above is fixed to an edge portion of the opening 42aA in the plate main body 42. The receiving member 43A is formed in a rectangular frame shape when viewed in the width direction Y. The receiving member 43A protrudes toward a left side from the plate main body 42 over the entire circumference of the edge portion of the opening 42aA.

Similarly, in the plate main body 42, the receiving member 43B is fixed to an edge portion of the opening 42aB, and the receiving member 43C is fixed to an edge portion of the opening 42aC.

The opening 42aA of the plate main body 42 and the opening of the receiving member 43A constitute a first opening 41aA of the first partition plate 41. Similarly, the opening 42aB of the plate main body 42 and the opening of the receiving member 43B constitute a first opening 41aB of the first partition plate 41. The opening 42aC of the plate main body 42 and the opening of the receiving member 43C constitute a first opening 41aC of the first partition plate 41.

An opening 36a is formed in the front portion of the first side plate 36. The opening 36a of the first side plate 36 is covered with a work cover 45. The work cover 45 is detachably attached to the first side plate 36 by a fastening member 46 such as a bolt or a screw.

The plurality of battery modules 28 include a battery module 28A, a battery module 28B, and a battery module 28C.

A configuration of the battery module 28A and configurations of the battery modules 28B and 28C are the same as each other. Thus, the components of the battery module 28A are denoted by adding a capital letter "A" to a numeral, or a numeral and a lowercase letter. The components of the battery modules 28B and 28C corresponding to the battery module 28A are denoted by adding a capital letter "B" or "C" to the same numeral, or the same numeral and lowercase letter as in the battery module 28A. Therefore, duplicated description will be omitted.

For example, a second box 51A, to be described below, of the battery module 28A and second boxes 51B and 51C, to be described below, of the battery modules 28B and 28C have the same configuration as each other.

As shown in FIGS. 4 to 7, the battery module 28A includes the second box 51A, a plurality (three in the present embodiment) of storage batteries 52A, 53A, and 54A, and a packing (sealing member) 55A.

An external form of the second box 51A is formed in a rectangular parallelepiped box shape. A right side of the second box 51A opens to form a second opening 51aA in the second box 51A. The second box 51A is housed in the first box 27.

The second box 51A includes a second top plate 59A, a second bottom plate 60A, and second side plates 61A to 63A.

For example, the second top plate 59A and the second bottom plate 60A are formed in a rectangular shape that is long in the width direction Y. The second top plate 59A and the second bottom plate 60A are disposed to face each other in a vertical direction.

The second side plates 61A and 62A are provided to stand upright on outer edge portions in the width direction Y of the second bottom plate 60A. The second side plate 61A is disposed in the front of the second bottom plate 60A, and the second side plate 62A is disposed in the rear of the second bottom plate 60A. The second side plate 63A is provided to stand upright on a left outer edge portion in the longitudinal direction X of the second bottom plate 60A.

Figure 5:
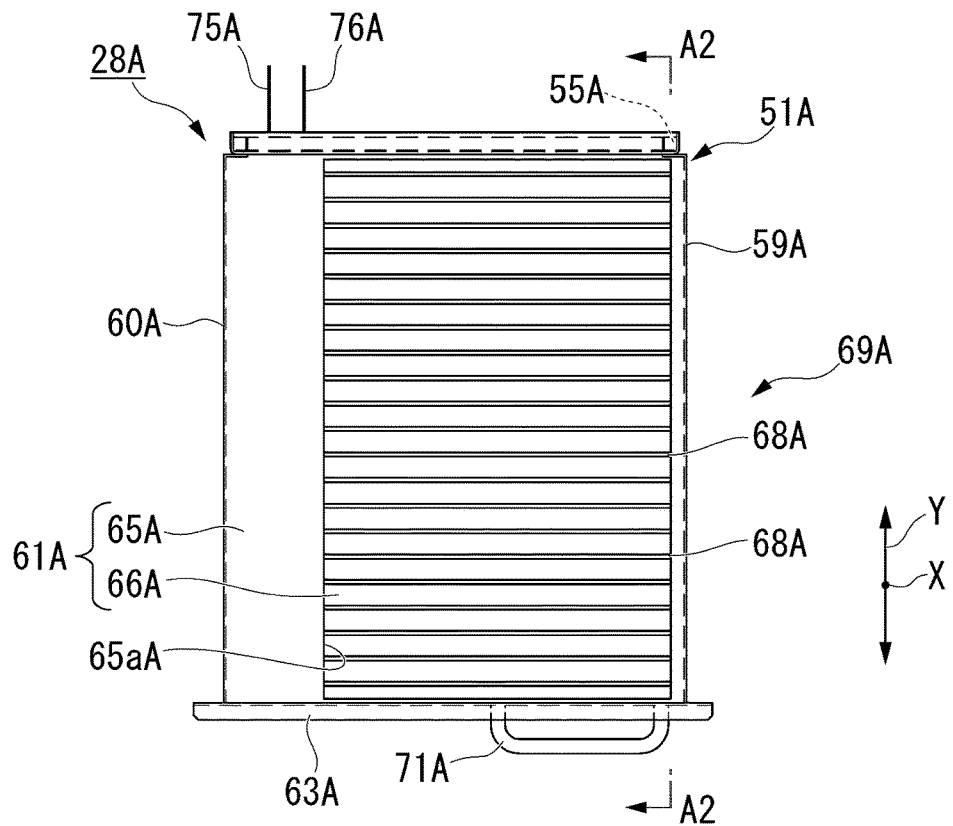
FIG. 5 is a view in a direction of arrow B1 in FIG. 4.
Figure 7:
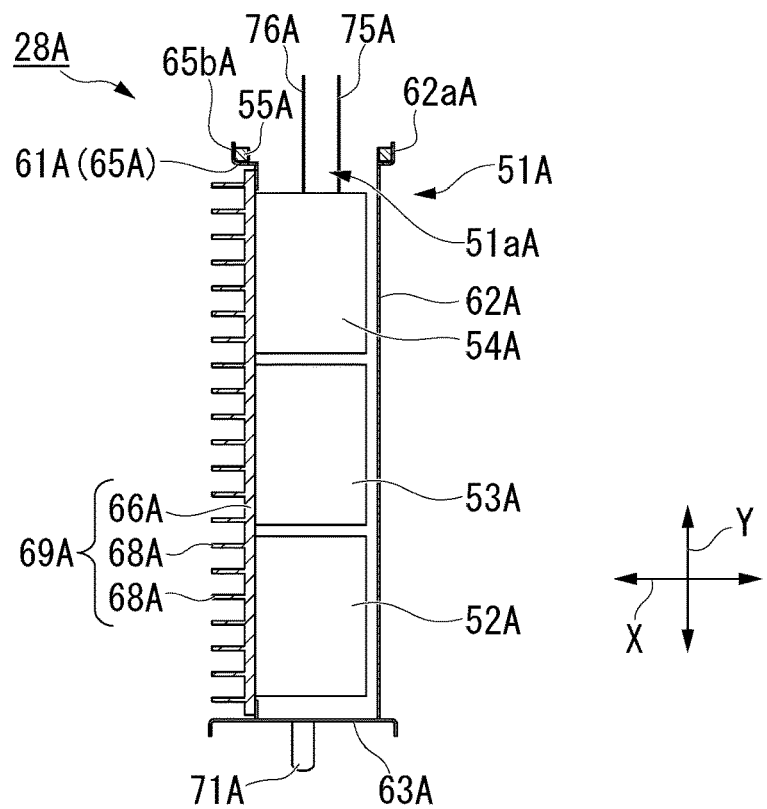
FIG. 7 is a cross-sectional view taken along section line A2-A2 in FIG. 5.

As shown in FIG. 5, the second side plate 61A includes a side plate main body 65A and a base (side plate) 66A. An opening 65aA is formed in an upper portion of the side plate main body 65A. The opening 65aA is formed at a central portion in the width direction Y of the side plate main body 65A. As shown in FIG. 7, a receiving part 65bA is formed at a right end portion of the side plate main body 65A by the side plate main body 65A forming a step forward.

As shown in FIG. 5, the base 66A is disposed in the front of the opening 65aA of the side plate main body 65A. The base 66A and the side plate main body 65A are fixed by a fastening member (not shown). Further, the entire second side plate 61A may be configured by the base.

The second top plate 59A, the second bottom plate 60A, the second side plates 62 and 63A, and the side plate main body 65A are formed of a steel plate or the like.

Figure 4:
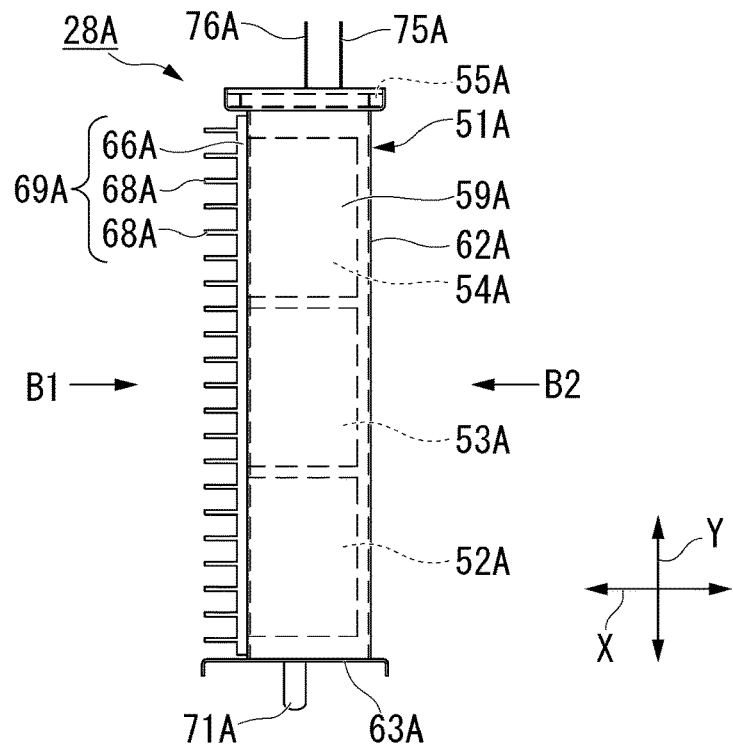
FIG. 4 is a plan view showing the electricity storage device of the first embodiment.

As shown in FIGS. 4 and 5, a plurality of fin members (protrusions) 68A are provided on the base 66A. The base 66A and the plurality of fin members 68A constitute a heat-dissipation fin 69A.

Further, the number of fin members 68A provided on the base 66A is not limited and may be one. The fin members 68A may not be provided on the base 66A.

The plurality of fin members 68A are formed in a plate shape such that a thickness direction thereof is the width direction Y and protrude toward the front from the base 66A. The plurality of fin members 68A extend in the vertical direction. The plurality of fin members 68A are disposed to be aligned in the width direction Y with spaces therebetween.

For example, the base 66A and the plurality of fin members 68A may be integrally formed by extrusion molding using aluminum or the like.

As shown in FIG. 7, a receiving part 62aA is formed at a right end portion of the second side plate 62A by the second side plate 62A forming a step rearward. On the second top plate 59A and the second bottom plate 60A, receiving parts (reference numerals omitted) similar to the receiving part 65bA of the side plate main body 65A and the receiving part 62aA of the second side plate 62A are formed.

The second side plate 63A protrudes to the front to a front end portion of the heat-dissipation fin 69A. The second side plate 63A protrudes to the rear with respect to the second side plate 62A.

As shown in FIG. 5, a handle 71A extending in the vertical direction is fixed to the second side plate 63A.

Types of the storage batteries 52A to 54A are not particularly limited. For example, the storage batteries 52A to 54A are lithium ion secondary batteries. As shown in FIG. 7, the storage batteries 52A to 54A are disposed to be aligned in that order from the left to the right in the width direction Y with spaces therebetween. The storage batteries 52A to 54A are disposed in the second box 51A while being connected to the base 66A. Further, the term "connect" as used in the present specification means not only connecting something in direct contact without other members interposed, but also connecting something in indirect contact with other members interposed.

Further, the number of storage batteries included in the battery module 28A is not limited, and may be one, two, or four or more.

It is preferable that temperature sensors and voltage sensors be attached to the storage batteries 52A to 54A. The temperature sensor measures a temperature of an outer surface or the like of the storage batteries 52A to 54A. The voltage sensor measures a voltage value output from the storage batteries 52A to 54A.

Figure 6:
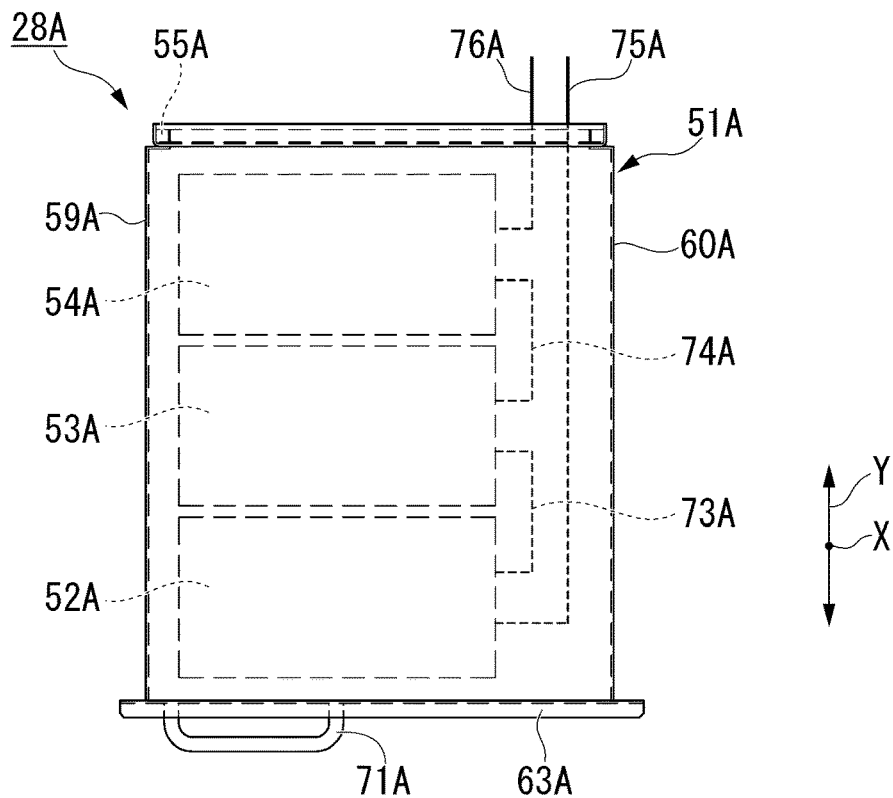
FIG. 6 is a view in a direction of arrow B2 in FIG. 4.

As shown in FIG. 6, the storage battery 52A and the storage battery 53A, and the storage battery 53A and the storage battery 54A are connected by electric wires 73A and 74A, respectively. An electric wire 75A is connected to the storage battery 52A. An electric wire 76A is connected to the storage battery 54A. The three storage batteries 52A to 54A are connected in series by the electric wires 73A to 76A so that power of the storage batteries 52A to 54A is taken out to the outside.

As shown in FIG. 7, the storage batteries 52A to 54A are fixed to a rear surface of the base 66A by a fastening member (not shown) or the like. It is preferable that a compound having high thermal conductivity be disposed between the storage batteries 52A to 54A and the base 66A.

As shown in FIG. 6, the storage batteries 52A to 54A are disposed on an upper portion of the battery module 28A. The electric wires 73A to 76A described above are routed around a lower portion of the battery module 28A.

As shown in FIGS. 6 and 7, the packing 55A is formed in a rectangular frame shape when viewed in the width direction Y. The packing 55A is formed using hollow rubber or the like. The packing 56A is fixed to the receiving part 65b of the side plate main body 65A, the receiving part 62aA of the second side plate 62A, and the receiving parts of the second top plate 59A and the second bottom plate 60A with the right side thereof exposed. The packing 56A is fixed to an edge portion of the second opening 51aA in the second box 51A.

Further, the packing 56A may be fixed to an edge portion of the first opening 41aA in the first partition plate 41.

As shown in FIG. 3, a length in the longitudinal direction X of the entire battery modules 28A to 28C configured as described above and a length 35 in the longitudinal direction X of the opening 35a of the first side plate are equal to each other. The second box 51A of the battery module 28A is detachably attached to the first box 27 through the opening 35a of the first side plate 35. When the edge portion of the first opening 41aA of the first partition plate 41 comes into contact with the packing 55A of the battery module 28A, the edge portion of the first opening 41aA of the first partition plate 41 and the edge portion of the second opening 51aA of the second box 51A are hermetically connected over the entire circumference of both the edge portions, and thereby the second box 51A is attached to the first box 27. At this time, the first opening 41aA of the first partition plate 41 communicates with the second opening 51aA of the second box 51A.

The second boxes 51B and 51C of the battery modules 28B and 28C are attached to the first box 27 in the same manner.

At this time, a flow path 79A is configured by the plurality of first through-holes 33a of the first top plate 33, the plurality of first through-holes of the first bottom plate 34, the first side plate 37, and the first partition plate 41 of the first box 27, and the packing 55A, the second side plate 63A, and the base 66A of the heat-dissipation fin 69A of the battery module 28A. The flow path 79A is configured by the first box 27 and the battery module 28A.

The flow path 79A is formed inside the first box 27 and outside the second box 51A and penetrates the first box 27 in the vertical direction. The base 66A of the heat-dissipation fin 69A constitutes a part of the flow path 79A.

The plurality of fin members 68A of the heat-dissipation fin 69A protrude toward the inside of the flow path 79A from the base 66A.

A flow path 79B is configured by the plurality of first through-holes 33a of the first top plate 33, the plurality of first through-holes of the first bottom plate 34, and the first partition plate 41 of the first box 27, the packing 55A, the second side plate 62A, and the second side plate 63A of the battery module 28A, and a packing 55B, a second side plate 63B, and a base 66B of a heat-dissipation fin 69B of the battery module 28B. The flow path 79B is configured by the first box 27 and the battery modules 28A and 28B.

In the same manner, a flow path 79C is configured by the first box 27, the battery module 28B, and the battery module 28C.

Further, the second side plate 63A of the battery module 28A and the first box 27 are fixed by a fastening member 72A (see FIG. 1). The flow paths 79A, 79B, and 79C may be constituted only by the bases 66A, 66B, and 66C of the heat-dissipation fins 69A, 69B, and 69C, respectively.

The electric wire 75A of the battery module 28A and an electric wire 76B of the battery module 28B are connected by an electric wire 82. An electric wire 75B of the battery module 28B and an electric wire 76C of the battery module 28C are connected by an electric wire 83. An electric wire 84 is connected to the electric wire 76A of the battery module 28A. An electric wire 85 is connected to an electric wire 75C of the battery module 28C. The electric wires 84 and 85 are connected to the protection circuit 29.

The nine storage batteries 52A to 54A, 52B to 54B, and 52C to 54C (hereinafter abbreviated as storage batteries 52A to 54A or the like) in the three battery modules 28A to 28C are connected in series by the electric wires 82 to 85, and power of the storage batteries 52A to 54A or the like is taken out to the outside.

Temperatures detected from the battery modules 28A to 28C by the temperature sensors and voltages detected therefrom by the voltage sensors are transmitted. The temperatures and voltages are transmitted to the control circuit 30 by the electric wires 87a, 87b, and 87c connecting the battery modules 28A to 28C in series.

Further, the electric wire 87a connects the battery module 28A and the battery module 28B. The electric wire 87b connects the battery module 28B and the battery module 28C. The electric wire 87c connects the battery module 28C and the control circuit 30.

The protection circuit 29 includes a contactor or the like. The control circuit 30 includes a printed circuit board or the like. The protection circuit 29 and the control circuit 30 are connected to an upper level controller (not shown).

The control circuit 30 aggregates temperatures and voltages transmitted from the battery modules 28A to 28C. Then, for example, when at least one of the transmitted temperatures is higher than a predetermined temperature threshold value, a warning is sent to the upper level controller.

The protection circuit 29 opens the contactor on the basis of an instruction from the upper controller.

Next, in the electricity storage device 26 configured as described above, a procedure for attaching the battery modules 28A to 28C to the first box 27 from a state in which the battery modules 28A to 28C are not attached to the first box 27 will be described.

An operator grasps the handle 71A of the battery module 28A and inserts the battery module 28A into the first box 27 through the opening 35a of the first box 27. The edge portion of the first opening 41aA of the first partition plate 41 is brought into contact with the packing 55A of the battery module 28A to attach the battery module 28A to the first box 27. The battery module 28A is fixed to the first box 27 using the fastening member 72A. In the same manner, the battery modules 28B and 28C are attached to the first box 27.

The fastening member 46 and the work cover 45 are removed from the first box 27. The operator inserts a hand or the like into the first box 27 through the opening 36a of the first side plate 36. The battery modules 28A to 28C, the protection circuit 29, and the control circuit 30 are connected to each other using the electric wires 82 to 85 and 87a to 87c.

When the connection is completed, the opening 36a of the first side plate 36 is closed with the fastening member 46 and the work cover 45.

Next, cooling of the electricity storage device 26 configured as described above will be described.

The storage batteries 52A to 54A or the like of the electricity storage device 26 generate heat when supplying power or storing power.

The heat generated by the storage batteries 52A to 54A is transmitted to the plurality of fin members 68A via the base 66A of the heat-dissipation fin 69A. When the heat is transmitted to the heat-dissipation fin 69A, the storage batteries 52A to 54A are cooled.

Air near the heat-dissipation fin 69A in the flow path 79A increases in temperature due to the heat transmitted from the storage batteries 52A to 54A and is expanded to a lower density. The air with the lowered density moves upward through spaces between the fin members 68A adjacent to each other in the width direction Y. The air that has moved upward flows to the outside of the electricity storage device 26 through the plurality of first through-holes 33a of the battery module 28A.

On the other hand, since a pressure in the flow path 79A decreases, air having a relatively low temperature outside the electricity storage device 26 is suctioned into the flow path 79A from the plurality of first through-holes of the first bottom plate 34. The air may include dust or the like due to an influence of a track below the car body. However, since the edge portion of the first opening 41aA in the first partition plate 41 and the edge portion of the second opening 51aA in the second box 51A are hermetically connected by the packing 55A, the air flowing in the flow path 79A is inhibited from flowing into a region inside the first box 27 in which the storage batteries 52A to 54A are disposed.

Similarly, the storage batteries 52B to 54B and 52C to 54C are cooled by the air flowing in the flow paths 79B and 79C, respectively.

As described above, air is suctioned into the flow paths 79A to 79C by a so-called chimney effect without using a fan. Therefore, the electricity storage device 26 can efficiently cool the storage batteries 52A to 54A or the like by a natural cooling method.

As described above, according to the electricity storage device 26 of the present embodiment, the air flowing through the flow path 79A that is configured to include the base 66A to which the storage batteries 52B to 54B are connected flows out to the outside. Then, a pressure in the flow path 79A decreases, and air having a relatively low temperature is suctioned into the flow path 79A from the outside. Accordingly, the storage batteries 52A to 54A can be efficiently cooled without using a fan. Since no fan is used, maintenance of the electricity storage device 26 is facilitated.

Since the electricity storage device 26 includes the plurality of fin members 68A, heat transmitted to the base 66A from the storage batteries 52A to 54A can be efficiently transmitted to the air in the flow path 79A.

When the second box 51A of the battery module 28A is attached to the first box 27, the first opening 41aA of the first partition plate 41 communicates with the second opening 51aA of the second box 51A. Therefore, the air in the flow path 79A flowing into the second box 51A can be inhibited.

The packing 55A is fixed to the edge portion of the second opening 51aA in the second box 51A. Therefore, a hermetic connection between the edge portion of the first opening 41aA in the first partition plate 41 and the edge portion of the second opening 51aA in the second box 51A can be hermetically connected more reliably.

Also, according to the railroad car of the present embodiment, a railroad car can be configured using the electricity storage device 26 in which the storage batteries 52A to 54A can be efficiently cooled without using a fan.

Second Embodiment

Next, a second embodiment of an electricity storage device of a railroad car will be described with reference to FIGS. 8 to 11, but components the same as those in the above-described embodiment will be denoted by the same reference numerals, detailed description thereof will be omitted, and only different points will be described.

Figure 8:
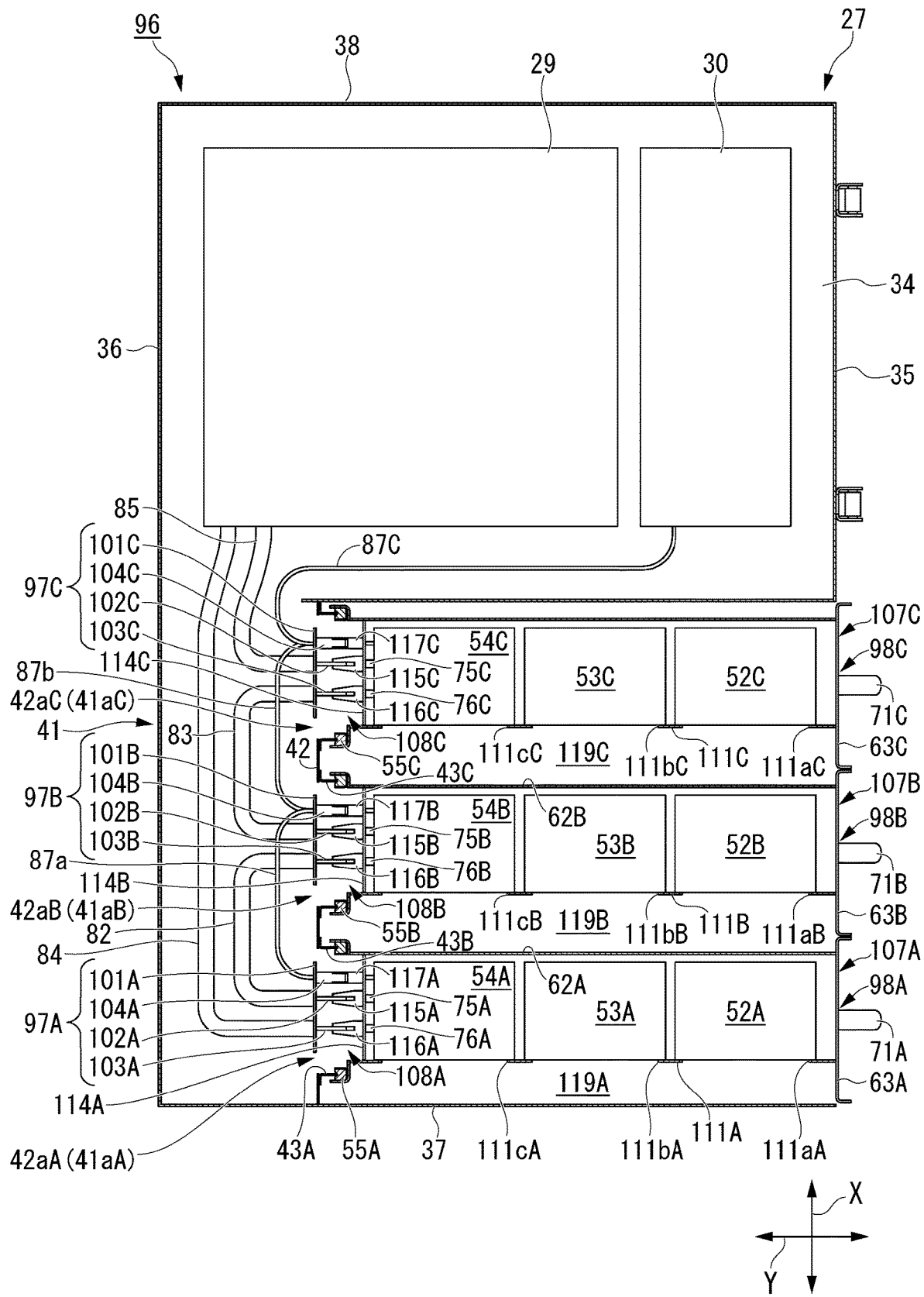
FIG. 8 is a cross-sectional view of an electricity storage device of a railroad car of a second embodiment as seen from above.

As shown in FIG. 8, an electricity storage device 96 of the present embodiment includes connection circuits 97A, 97B, and 97C, and battery modules 98A, 98B, and 98C instead of the battery modules 28A to 28C of the electricity storage device 26.

The connection circuit 97A includes a board 101A and first connectors 102A, 103A, and 104A. The board 101A is disposed in an opening 42aA of a plate main body 42 in a first box 27. The board 101A is fixed to a first bottom plate 34 or the like of the first box 27 such that a thickness direction thereof is a width direction Y.

The first connectors 102A to 104A are fixed to a left surface of the board 101A. The first connector 103A, the first connector 102A, and the first connector 104A are disposed to be aligned in that order from the front toward the rear. The first connector 102A is connected to an end portion of an electric wire 82. The first connector 103A is connected to an end portion of an electric wire 84. The first connector 104A is connected to an end portion of an electric wire 87a.

In the connection circuit 97B, a first connector 102B is connected to an end portion of an electric wire 83. A first connector 103B is connected to an end portion of the electric wire 82. A first connector 104B is connected to end portions of the electric wire 87a and an electric wire 87b.

In the connection circuit 97C, the first connector 102C is connected to an end portion of an electric wire 85. A first connector 103C is connected to end portions of the electric wires 87b and 83. A first connector 104C is connected to an end portion of the electric wire 87c.

Further, in the present embodiment, the opening 36a is not formed in a first side plate 36 of the first box 27. The electricity storage device 96 does not include the work cover 45 and the fastening member 46.

Figure 9:
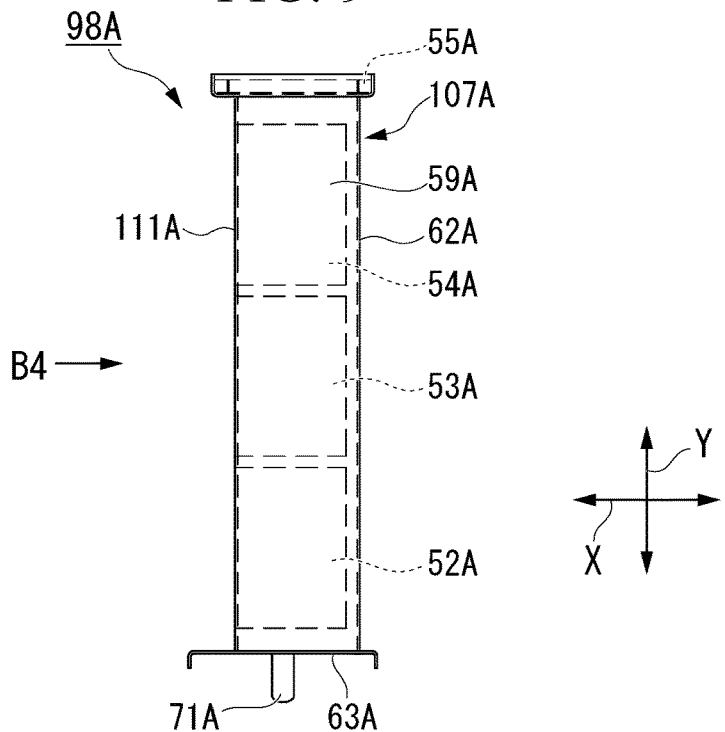
FIG. 9 is a plan view showing an electricity storage device of the second embodiment.
Figure 10:
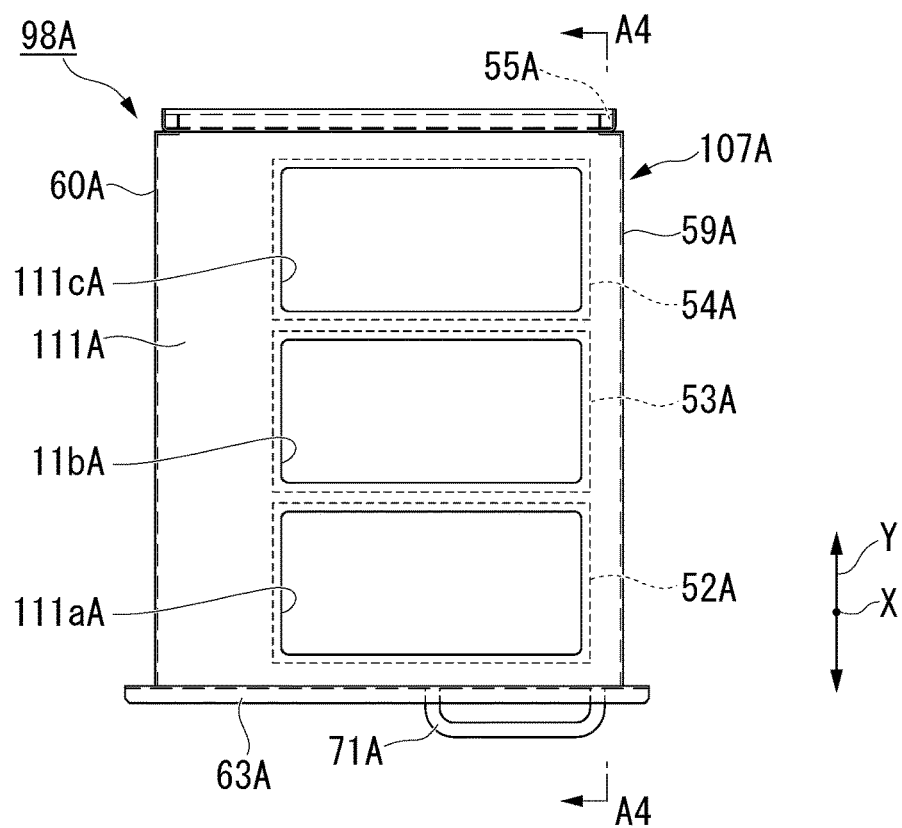
FIG. 10 is a view in a direction of arrow B4 in FIG. 9.
Figure 11:
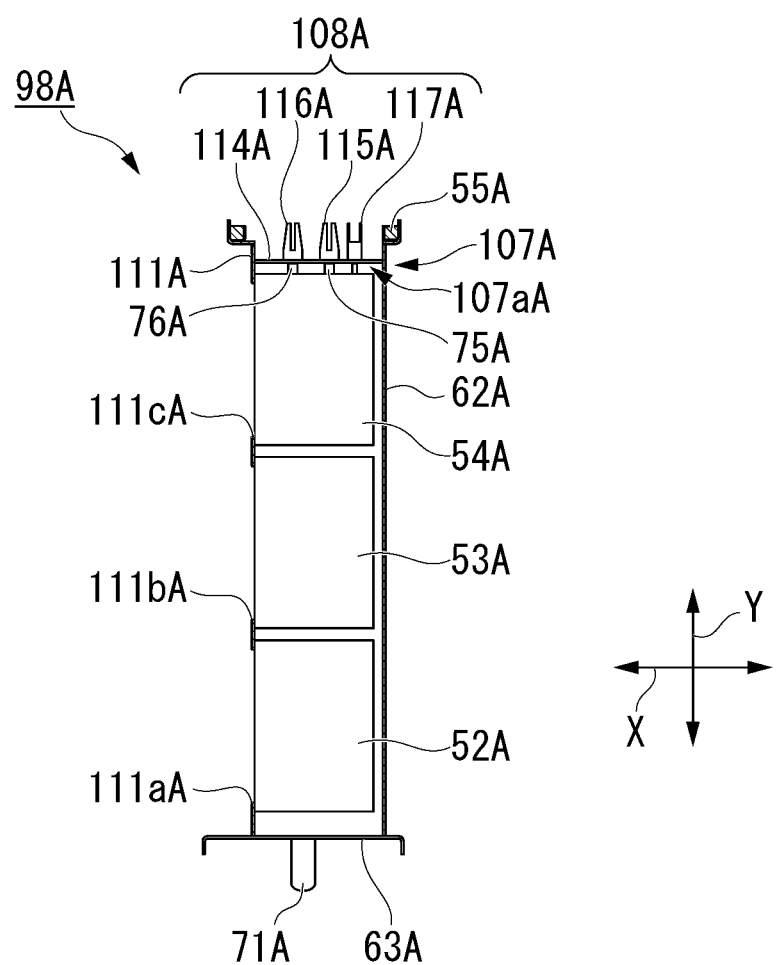
FIG. 11 is a cross-sectional view taken along section line A4-A4 in FIG. 10.

As shown in FIGS. 9 to 11, the battery module 98A includes a second box 107A and a connection circuit 108A instead of the second box 51A and the heat-dissipation fin 69A of the battery module 28A.

The second box 107A includes a second side plate (side plate) 111A instead of the second side plate 61A of the second box 51A. The second side plate 111A is provided to stand upright on an outer edge portion in the width direction Y of a second bottom plate 60A. The second side plate 111A is formed of a steel plate or the like.

A plurality (three in the present embodiment) of openings 111aA, 111bA, and 111cA are formed in an upper portion of the second side plate 111A. The openings 111aA to 111cA are formed in a vertically long rectangular shape when viewed in a longitudinal direction X. The openings 111aA to 111cA are disposed to be aligned in that order from the left to the right in the width direction Y with spaces therebetween.

The storage battery 52A is fixed to the second side plate 111A by a fastening member (not shown) to close the opening 111aA of the second side plate 111A. In the same manner, storage batteries 53A and MA are fixed to close the openings 111bA and 111cA.

As shown in FIG. 11, a second opening 107aA is formed in the second box 107A instead of the second opening 51aA of the second box 51A.

The connection circuit 108A includes a board 114A and second connectors 115A, 116A, 117A.

The board 114A is disposed in the second opening 107aA of the second box 107A. The board 114A is fixed to the second box 107A such that a thickness direction thereof is the width direction Y.

The second connectors 115A to 117A are provided on the second box 107A while being electrically connected to the storage batteries 52A to 54A. The second connectors 115A to 117A are fixed to a right surface of the board 114A. The second connector 116A, the second connector 115A, and the second connector 117A are disposed to be aligned in that order from the front toward the rear. The second connector 115A is connected to an end portion of an electric wire 75A. The second connector 116A is connected to an end portion of an electric wire 76A. The second connector 117A is connected to a temperature sensor and a voltage sensor.

As shown in FIG. 8, the second connector 115A is detachably attached to the first connector 102A in the width direction Y. Similarly, the second connectors 116A and 117A are detachably attached to the first connectors 103A and 104A in the width direction Y.

When the second box 107A of the battery module 98A is attached to the first box 27, the second connectors 115A to 117A of the connection circuit 108A are respectively attached to the first connectors 102A to 104A of the connection circuit 97A. On the other hand, when the second box 107A of the battery module 98A is removed from the first box 27, the second connectors 115A to 117A of the connection circuit 108A are removed from the first connectors 102A to 104A of the connection circuit 97A.

A flow path 119A is configured by a plurality of first through-holes 33a of a first top plate 33, a plurality of first through-holes of the first bottom plate 34, a first side plate 37, and a first partition plate 41 of the first box 27, and a packing 55A, a second side plate 63A, the second side plate 111A, and the storage batteries 52A to 54A of the battery module 98A. The storage batteries 52A to 54A are exposed in the flow path 119A through the openings 111aA to 111cA.

A flow path 119B is configured by the plurality of first through-holes 33a of the first top plate 33, the plurality of first through-holes of the first bottom plate 34, and the first partition plate 41 of the first box 27, the packing 55A, a second side plate 62A, and the second side plate 63A of the battery module 98A, and a packing 55B, a second side plate 63B, a second side plate 111B, and storage batteries 52B to 54B of the battery module 98B.

In the same manner, a flow path 119C is configured by the first box 27, the battery module 98B, and the battery module 98C.

Next, in the electricity storage device 96 configured as described above, a procedure for attaching the battery modules 98A to 98C to the first box 27 from a state in which the battery modules 98A to 98C are not attached to the first box 27 will be described.

An operator grasps a handle 71A of the battery module 98A and inserts the battery module 98A into the first box 27 through an opening 35a of the first box 27. An edge portion of the first opening 41aA of the first partition plate 41 is brought into contact with the packing 55A of the battery module 98A to attach the battery module 98A to the first box 27. At this time, the second connectors 115A to 117A of the connection circuit 108A are attached to the first connectors 102A to 104A of the connection circuit 97A, respectively.

In the same manner, the battery modules 98B and 98C are attached to the first box 27.

In the present embodiment, there is no need to remove the work cover 45 to perform connection work of the electric wires 82 to 85 and 87a to 87c after the battery modules 98A to 98C are attached to the first box 27.

Next, cooling of the electricity storage device 96 configured as described above will be described.

Heat generated by the storage batteries 52A to 54A is transmitted to air near the openings 111aA to 111cA in the flow path 119A. At this time, since the storage batteries 52A to 54A are in direct contact with the air in the flow path 119A, heat is efficiently transmitted.

Since heat is transmitted to the air, the storage batteries 52A to 54A are cooled. The air to which heat has been transmitted increases in temperature and is expanded to a lower density. The air with the lowered density moves upward. The air that has moved upward flows to the outside of the electricity storage device 96 through the plurality of first through-holes 33a or the like of the battery module 98A.

As described above, according to the electricity storage device 96 of the present embodiment, the storage batteries 52A to 54A are in direct contact with the air in the flow path 119A through the openings 111aA to 111cA. Therefore, heat exchange between the storage batteries 52A to 54A and the air in the flow path 119A is efficiently performed, and the storage batteries 52A to 54A can be efficiently cooled without using a fan.

The electricity storage device 96 includes the first connectors 102A to 104A and second connectors 115A to 117A. The second connectors 115A to 117A can be attached to the first connectors 102A to 104A by simply attaching the second box 107A of the battery module 98A to the first box 27. The second connectors 115A to 117A can be removed from the first connectors 102A to 104A by simply removing the second box 107A of the battery module 98A from the first box 27.

Further, the electricity storage device 96 may not include the connection circuits 97A to 97C and 108A to 108C.

Figure 12:
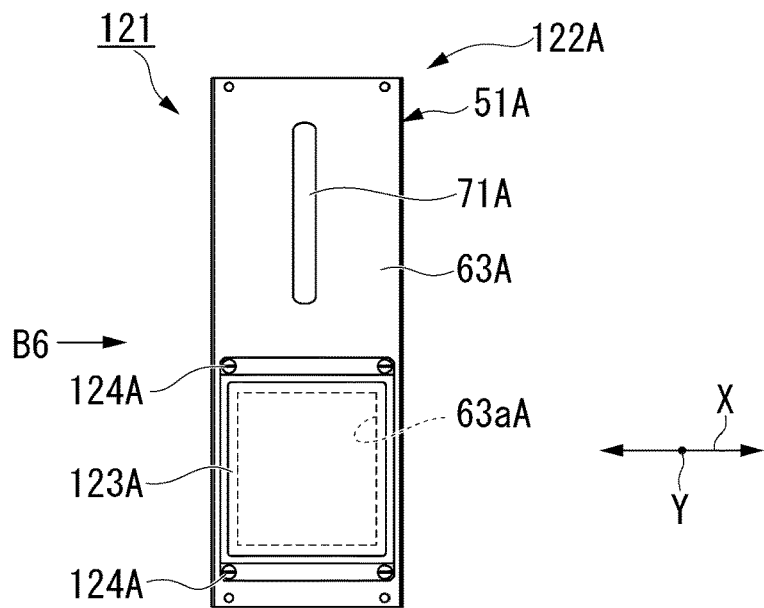
FIG. 12 is a side view showing a main part of an electricity storage device of a modified example in the railroad car of the embodiment.
Figure 13:
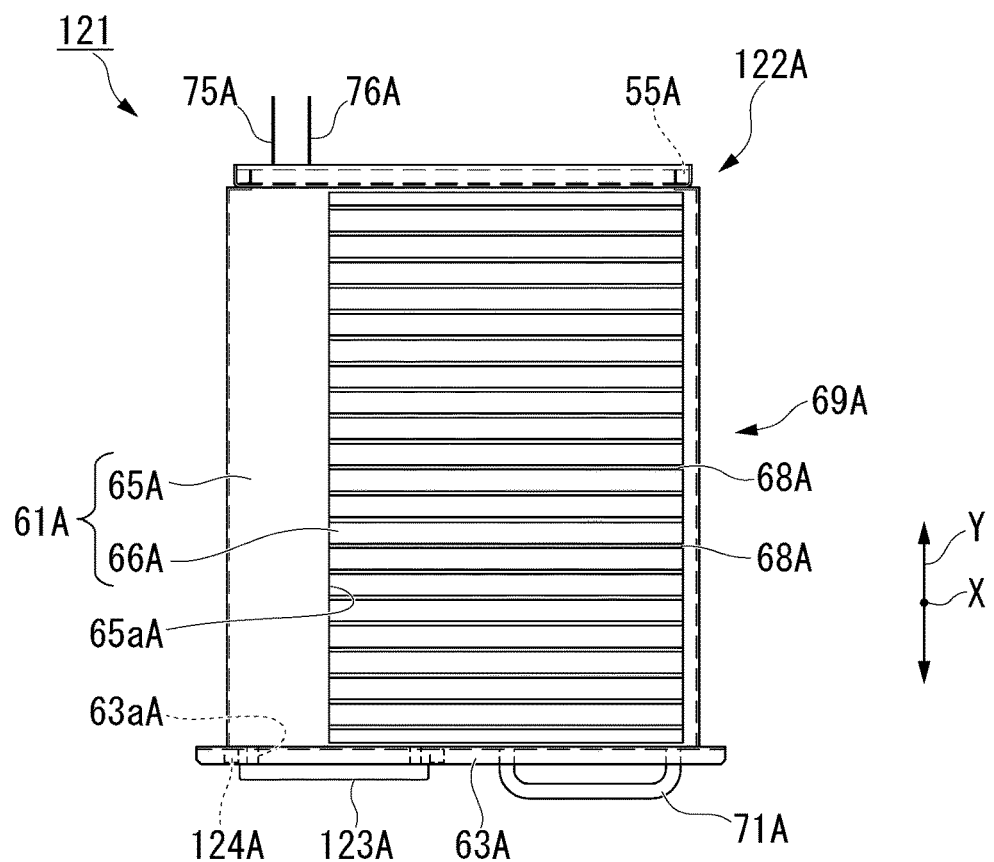
FIG. 13 is a view in a direction of arrow B6 in FIG. 12.

In the first embodiment, a through-hole 63aA may be formed in the second side plate 63A in the second box 51A of a battery module 122A as in an electricity storage device 121 shown in FIGS. 12 and 13. Then, the electricity storage device 121 may include a cover 123A which removably covers the through-hole 63aA with respect to the second side plate 63A. The cover 123A is detachably attached to the second side plate 63A using a fastening member 124A such as a bolt or a screw.

There are cases in which the operator needs to visually inspect the storage batteries 52A to 54A in the second box 51A on a regular basis. When it is configured like the electricity storage device 121 of the modified example described above, the fastening member 124A and the cover 123A can be removed from the second side plate 63A of the second box 51A, and a state of the storage batteries 52A to 54A can be visually inspected through the through-hole 63aA.

When the inspection is completed, the fastening member 124A and the cover 123A are attached to the second side plate 63A.

Figure 14:
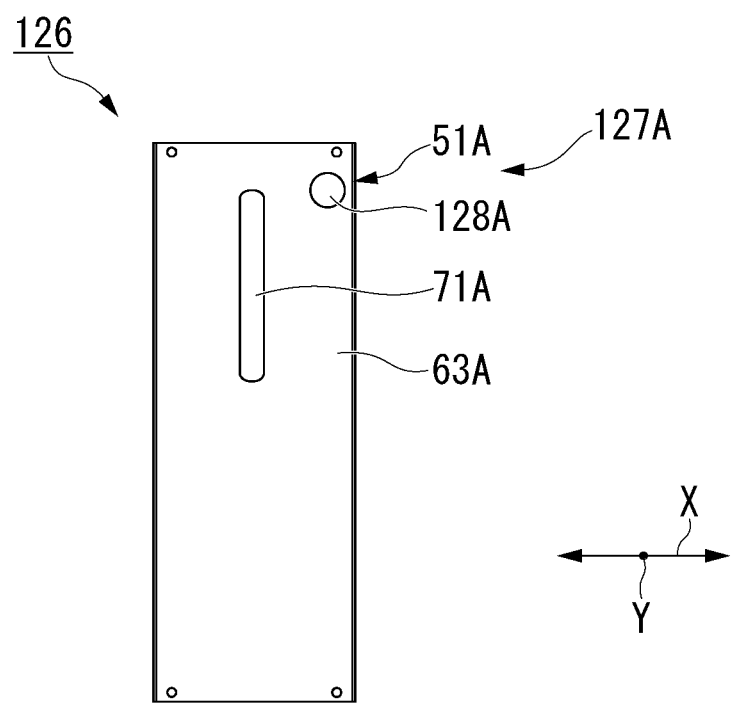
FIG. 14 is a side view showing a main part of an electricity storage device of a modified example in the railroad car of the embodiment.

As in an electricity storage device 126 shown in FIG. 14, a ventilator (ventilator) 128A may be provided on the second side plate 63A of the battery module 127A. For example, the ventilator 128A may have a functional film which is permeable to gases but not permeable to a liquid. The ventilator 128A allows gases inside and outside the second box 51A to flow back and forth and makes a liquid impossible to flow therebetween.

For example, when the storage batteries 52A to 54A fail, there are cases in which gases are released from the storage batteries 52A to 54A. If the electricity storage device 126 is configured as described above, when a pressure of the gases released from the storage batteries 52A to 54A becomes higher than a certain pressure, the gases can be discharged to the outside of the second box 51A through the ventilator 128A. Therefore, an excessive pressure increase in the second box 51A can be inhibited.

The modified examples of the electricity storage devices 121 and 126 can also be applied to the second embodiment.

The battery modules 28A to 28C and 98A to 98C may not be attachable to and detachable from the first box 27 but may be fixed to the first box 27.

The battery modules 28A to 28C and 98A to 98C may not include the packings 55A to 55C.

According to at least one embodiment described above, when the flow paths 79A to 79C are provided, the storage batteries 52A to 54A or the like can be efficiently cooled without using a fan.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the inventions. The accompanying claims and their equivalents are intended to cover such forms or modifications as would fall within the scope of the inventions.

What is claimed is:

1. An electricity storage device, comprising:
a first box;
a second box comprising a side plate and housed in the first box;
a storage battery disposed in the second box while being connected to the side plate;
a flow path configured to comprise the side plate of the second box inside the first box and outside the second box and vertically penetrating the first box;
a partition plate provided in the first box to constitute a part of the flow path and including a first opening formed therein; and
a sealing member fixed to one of an edge portion of the first opening in the partition plate and an edge portion of the second opening in the second box, wherein
the second box includes a second opening formed therein,
the second box is detachably attached to the first box,
the first opening of the partition plate communicates with the second opening of the second box, and
the other of the edge portion of the first opening in the partition plate and the edge portion of the second opening in the second box and the sealing member are hermetically connected.

2. The electricity storage device according to claim 1, further comprising a protrusion protruding from the side plate toward an inside of the flow path.

3. The electricity storage device according to claim 1, wherein
an opening is formed in the side plate; and
the storage battery is exposed in the flow path through the opening.

4. The electricity storage device according to claim 1, further comprising:
a first connector provided in the first box; and
a second connector provided in the second box to be electrically connected to the storage battery and detachably attached to the first connector, wherein the second connector is attached to and detached from the first connector in accordance with attachment and detachment of the second box with respect to the first box.

5. The electricity storage device according to claim 1, wherein the second box has a through-hole formed therein, the electricity storage device further comprising a cover which removably covers the through-hole with respect to the second box.

6. The electricity storage device according to claim 1, further comprising a ventilator which allows gases inside and outside the second box to flow back and forth.

7. A railroad car comprising the electricity storage device according to claim 1.

* * * * *